United States Patent [19]
Dault et al.

[11] Patent Number: 5,416,283
[45] Date of Patent: May 16, 1995

[54] DROP-IN SPEAKER MOUNT

[75] Inventors: Robert Dault, Ferrysburg; Richard Young, Lowell, both of Mich.

[73] Assignee: ADAC Plastics, Inc., Grand Rapids, Mich.

[21] Appl. No.: 197,759

[22] Filed: Feb. 17, 1994

[51] Int. Cl.$^6$ .............................................. H05K 5/00
[52] U.S. Cl. .................................. 181/150; 181/141; 381/205
[58] Field of Search .................. 181/148, 150, 141; 381/188, 205

[56] References Cited

U.S. PATENT DOCUMENTS

| | | | |
|---|---|---|---|
| 4,072,829 | 2/1978 | Ogihara . | |
| 4,143,249 | 3/1979 | Cinquino . | |
| 4,152,544 | 5/1979 | Sanpei et al. . | |
| 4,179,009 | 12/1979 | Birkner | 181/171 |
| 4,359,133 | 11/1982 | Krolak | 181/148 X |
| 4,550,796 | 11/1985 | Tomita | 181/141 |
| 4,752,962 | 6/1988 | Thiele et al. | 381/188 X |
| 4,815,558 | 3/1989 | Krainhöfer | 181/141 |
| 4,852,178 | 7/1989 | Inkman et al. | 381/205 |
| 4,853,966 | 8/1989 | Skrzycki | 381/188 |

Primary Examiner—M. L. Gellner
Assistant Examiner—Khanh Dang
Attorney, Agent, or Firm—Young, McFarlane & Wood

[57] ABSTRACT

A mounting structure and methodology for mounting audio speakers in the package shelf of a motor vehicle. The speakers are mounted in a well formed integrally with the package shelf. The well opens at its upper end in the package shelf and defines an annular ledge at its lower end sized to seat the annular flange of the speaker. Resilient spring fingers on the annular wall of the well flex outwardly in response to insertion of the speaker into the well to allow passage of the speaker flange and thereafter, upon seating of the speaker flange on the ledge, flex inwardly to lockingly clamp the speaker flange between the spring fingers and the ledge. A grille structure includes a grille sized to fill the opening in the package shelf and a plurality of fingers extending downwardly from the grille and sized to fit within the well structure. The grille structure is installed with the grille fingers extending downwardly into the well for interlocking engagement with locking tab portions on the spring fingers and for engagement at their lower ends with the upper face of the speaker flange. The grille further includes a plurality of locking fingers which coact with holes in the panel so that, as the fingers of the grille structure interlock with the spring fingers and assume a position in clamping relation to the upper face of the speaker flange, the locking fingers snap into the holes in the panel to lock the grille structure to the panel.

33 Claims, 4 Drawing Sheets

DROP-IN SPEAKER MOUNT

BACKGROUND OF THE INVENTION

This invention relates to structure and methodology for mounting audio speakers in panels of motor vehicles and more specifically relates to structure and methodology for mounting speakers in the rear package shelf of a motor vehicle.

Modern day motor vehicles typically include one or more speakers positioned in spaced relation within the vehicle interior and arranged coactively to provide a desired sound mix within the vehicle. In vehicles of the sedan type, the speaker typically include a pair of speakers mounted in the package shelf positioned behind the rear seat of the vehicle. It is important from the standpoint of sound quality that the speakers be firmly and positively mounted in the package shelf and is important from the standpoint of assembly costs that the speakers be positioned in the package shelf with a minimum of labor and extraneous fasteners, whereas various structures and methodologies have been proposed to mount speakers in the package shelf or other panels of a motor vehicle, the prior art proposals require an extensive amount of time to install the speakers, thereby increasing the cost of the associated motor vehicle, or have provided a speaker mount that is not totally secure with the result that the sound quality is derogated,

SUMMARY OF THE INVENTION

This invention relates to improved structure and methodology for mounting speakers in the panel of a motor vehicle. More specifically, this invention relates to a structure and methodology for mounting speakers in the panels of motor vehicles wherein the speakers are quickly and inexpensively mounted in the panel and wherein the mounted speakers are secure and provide excellent sound quality.

The mounting structure of the invention is intended for use in mounting a speaker in a panel of a motor vehicle wherein the speaker includes an annular external flange and a speaker body positioned within the flange. The invention mounting structure comprises a well structure defined beneath the panel, opening at its upper end in an opening in the panel sized to allow the speaker to pass downwardly therethrough into the well, and defining a ledge at its lower end sized to receive and support the lower face of the speaker flange, and retainer means defined on the well structure proximate the ledge and operative to engage the upper face of the speaker flange and clamp the speaker flange between the retainer means and the ledge. This arrangement allows the speaker to be readily positioned in the well and simultaneously secured in position within the well.

According to a further feature of the invention, the retainer means comprises resilient fingers, and the resilient fingers are arranged to flex resiliently outwardly in response to movement of the speaker downwardly into the well and flex resiliently inwardly in response to seating of the speaker flange on the ledge. This arrangement allows the speaker flange to be readily and positively clamped between the resilient fingers and the ledge to securely mount the speaker to the panel. In one embodiment of the invention, the resilient fingers are formed integrally in an annular wall of the well structure and in another embodiment of the invention the resilient fingers are provided by separate resilient clips secured to an annular wall of the well structure.

According to a further feature of the invention, the mounting structure further includes a grille structure including a grille sized to fill the panel opening in overlying relation to a speaker supported on the ledge and retainer means extending downwardly from the grille and sized to engage the upper face of the speaker flange with the lower face of the speaker flange supported on the ledge. This arrangement allows the retainer means on the grille to provide a further clamping action with respect to the speaker flange to augment the clamping action provided by the retainer means on the well structure. In the disclosed embodiment of the invention, the grille structure retainer means comprises a plurality of circumferentially spaced fingers extending downwardly from the grille for engagement at their lower ends with the upper face of the speaker flange.

According to a further feature of the invention, the resilient fingers include locking tab portions extending laterally from the fingers, and the grille fingers passed outwardly of the locking tab portions to positively interlock the grille structure to the well structure and provide a further clamping and locking action with respect to the speaker flange.

According to a further feature of the invention, the mounting structure further includes coacting means on the grille structure and on the panel operative to snappingly secure the grille structure to the panel in response to downward movement of the grille structure with respect to the well structure. In the disclosed embodiment of the invention, the coacting means comprises resilient downwardly extending fingers on the grille structure in surrounding relation to the grille and holes in the panel in surrounding relation to the well structure.

In the disclosed embodiment of the invention, the well structure is formed integrally with the panel and the panel comprises a package shelf positioned behind the rear seat of the motor vehicle.

The invention also provides a method of mounting a speaker in a panel of a motor vehicle. According to the invention methodology, an opening is provided in the panel; a ledge is provided beneath the panel proximate the opening sized to seat the flange of the speaker; the speaker is moved downwardly through the opening to seat the speaker flange on the ledge; and retainer means are provided which are operative in response to seating of the speaker flange on the ledge to engage the upper face of the speaker flange and clamp the speaker flange between the retainer means and the ledge. This methodology provides a simple and effective means of mounting a speaker in a panel without the aid of separate fasteners and utilizing unskilled labor.

According to a further feature of the invention methodology, the step of providing a ledge comprises providing a well structure beneath the panel having an annular wall and defining the ledge proximate the lower end of the annular wall; and the step of providing retainer means comprises providing resilient means on the annular wall of the well which flex outwardly in response to downward movement of the speaker into the well and flex inwardly in response to seating of the speaker flange on the ledge to engage the upper face of the speaker flange and clamp the speaker flange between the ledge and the resilient means.

According to a further feature of the invention methodology, the method comprises the further steps of providing a grille structure including a grille sized to fill the opening in the panel and retainer means extending downwardly from the grille; and moving the grille structure to a position where the grille fills the opening and the grille retainer means extends downwardly from the grille for engagement at its lower end with the upper face of the speaker flange to clamp the speaker flange between the ledge and the retainer means. This methodology provides a redundant or back-up clamping action wherein the speaker flange is clamped to the ledge of the well structure by the resilient means in the annular wall of the well structure and by the retainer means extending downwardly from the grille.

DETAILED DESCRIPTION OF THE PREFERRED EMBODIMENT

Figure 1:
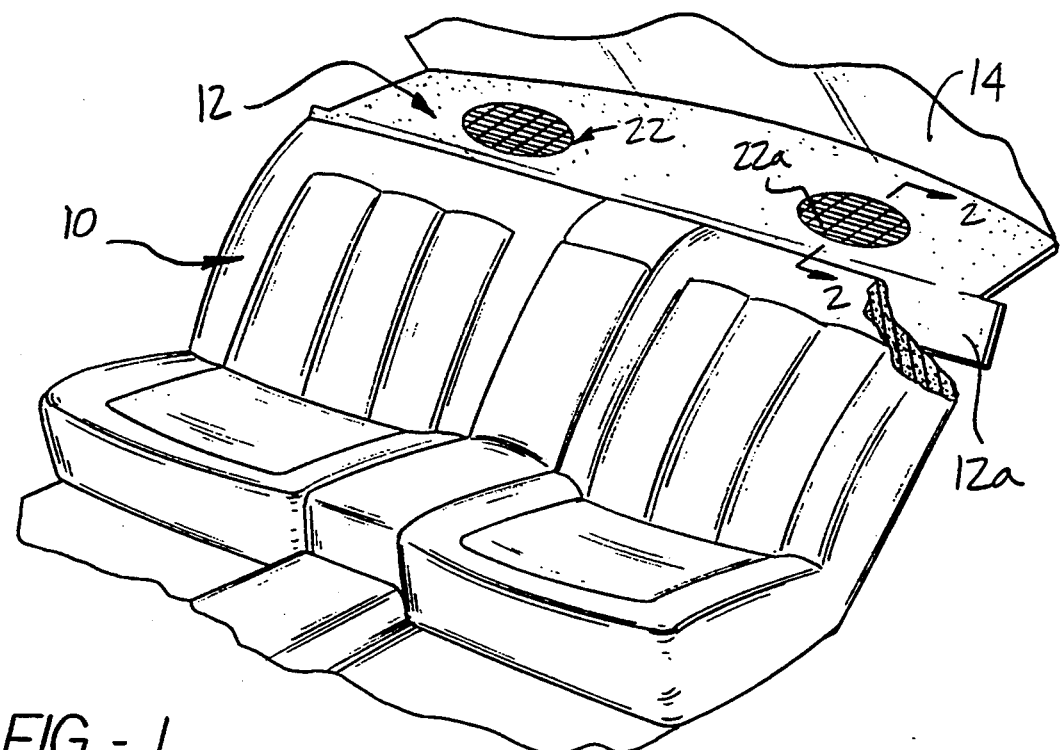
FIG. 1 is a fragmentary perspective view of the rear seat of a motor vehicle showing a package shelf positioned behind the rear seat and audio speakers positioned in the package shelf.
Figure 2:
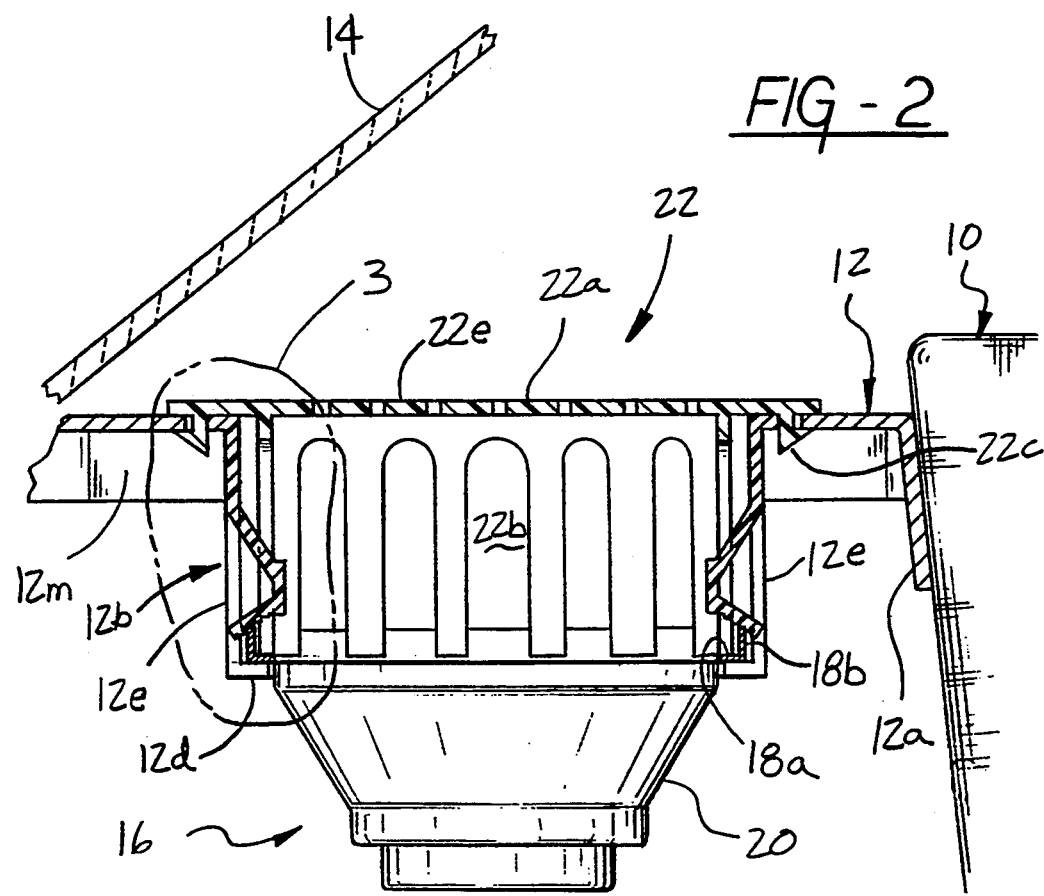
FIG. 2 is a cross sectional view taken on line 2—2 of FIG. 1.

The invention is illustrated in FIG. 1 in association with a motor vehicle having a rear seat 10 and a package shelf 12 positioned behind the rear seat and extending between the rear seat and the backlight 14. The package shelf may include a down turned front flange portion 12a which is positioned behind the seat 10 and which facilitates attachment of the package shelf to the vehicle body structure.

The invention provides a mounting structure to facilitate the positive and inexpensive installation of a pair of laterally spaced speakers in the package shelf so as to provide a stereo, audio capacity for the vehicle.

Each speaker 16 is of known form and includes an annular external flange 18 of oblong configuration and a speaker body 20 positioned within the flange and extending downwardly from the flange in a known basket configuration. Speaker flange 18 has an L-shaped configuration in cross section including an upstanding outer rim or lip portion 18a and a ledge portion 18b.

Each speaker 16 is mounted in the package shelf 12 utilizing a well structure 12b, formed integrally with the package shelf and having an oblong configuration corresponding generally to the oblong configuration of speaker flange 18, and a grille structure 22. Package shelf 12 and grille structure 22 may be formed for example of any suitable resilient plastic material such as polypropylene.

Well structure 12b is defined by an oblong annular side wall 12c opening at its upper end in an opening 24 in the package shelf and a lower oblong annular inwardly extending ledge 12d defined at the lower edge of annular side wall 12c. Ledge 12d defines an oblong opening 26 sized to pass speaker body 20 but preclude downward passage of speaker flange 18.

Annular wall 12c and opening 24 are sized to allow the speaker 18 to pass downwardly through opening 24 and into the well structure to position the lower face 18c of the speaker flange ledge portion 18b on the upper face of the ledge 12d. The oblong configuration of speaker flange 18 corresponds generally to the oblong configuration of ledge 12d so that the flange seats on the ledge 12d throughout the circumferential extent of the flange with the outer peripheral edge 18d of the flange positioned proximate the inboard surface 12h of side wall 12c proximate ledge 12d so that the speaker fits snugly within the well structure with the speaker body 20 projecting downwardly through ledge opening 26 to position the speaker body below the ledge.

Well structure 12b further includes a plurality of integral resilient fingers 12e spaced circumferentially around annular wall 12c proximate the ledge 12d. Each finger 12e has a cross shaped configuration and overlies a cross shaped cut out 12f formed in annular side wall 12c. Each cut out 12f has a configuration generally corresponding to the configuration of the associated finger 12e but is oversized with respect to the finger to allow the finger to assume a position nested within the cutout. Each finger 12e includes an upper spring portion 12f, a lower lock portion 12g defining a plurality of teeth or serrations 12i, and a central tab portion 12j defining a pair of wings or lock tabs 12k extending laterally from the main body of the finger. Fingers 12e are configured such that, in their relaxed configuration, each finger extends inwardly with respect to the inboard surface 12h of annular wall 12c to dispose the tab portion 12j in inwardly spaced relation to annular wall inboard surface 12h.

Figure 3:
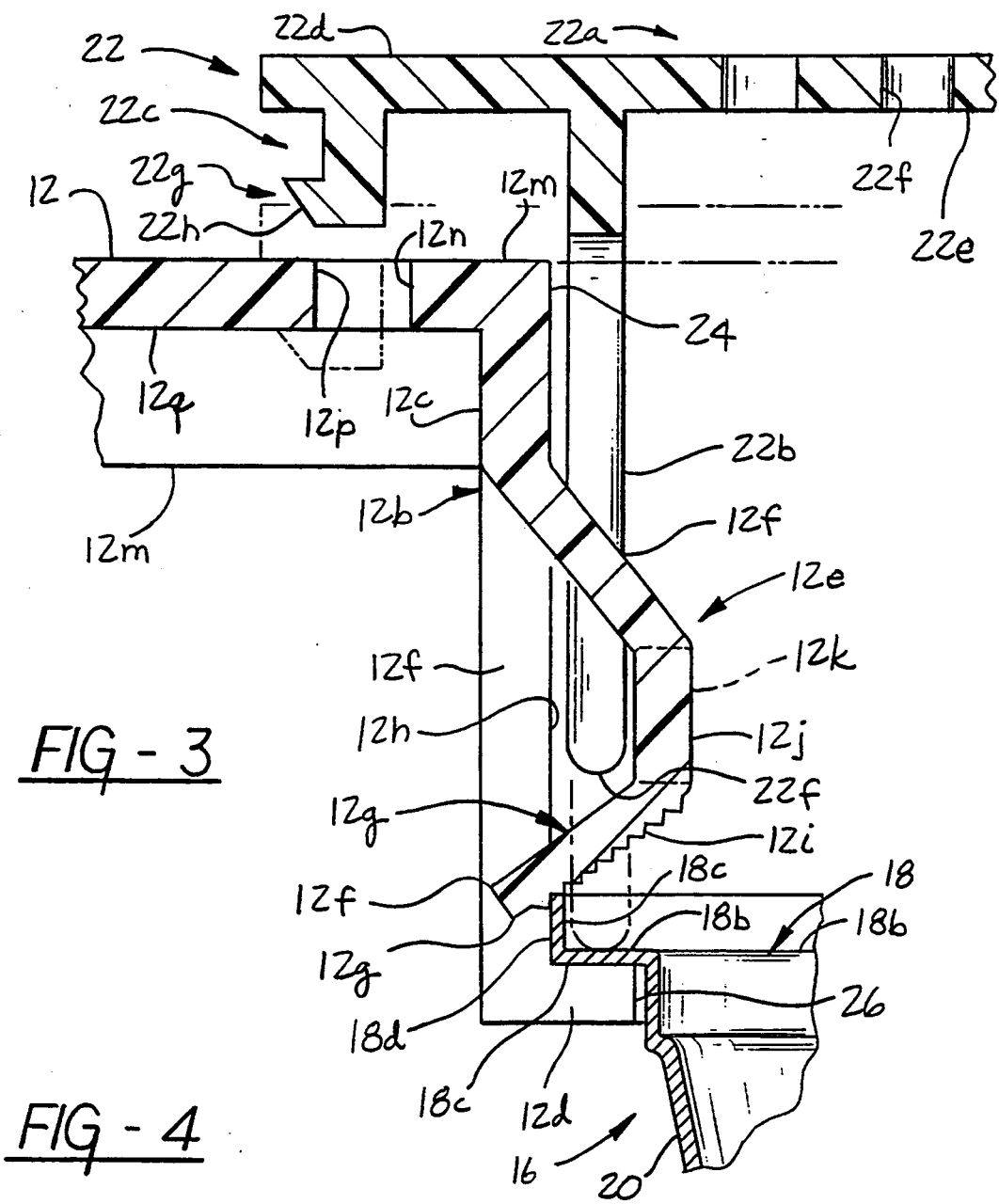
FIG. 3 is an enlarged view taken within the circle 3 of FIG. 2.
Figure 4:
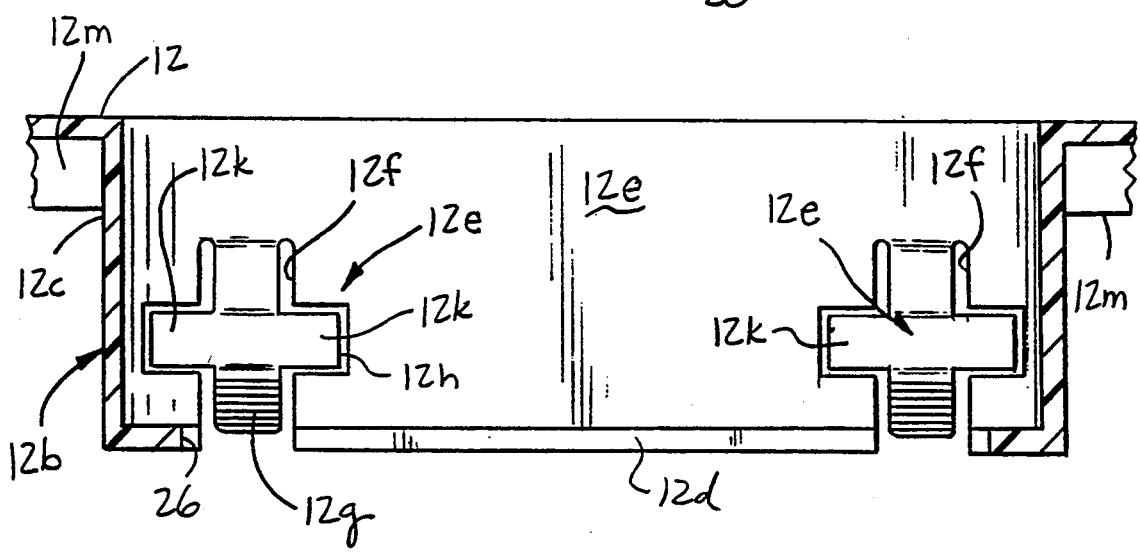
FIG. 4 is a fragmentary view looking in the direction of the arrow 4 in FIG. 2 with parts omitted for clarity.
Figure 5:
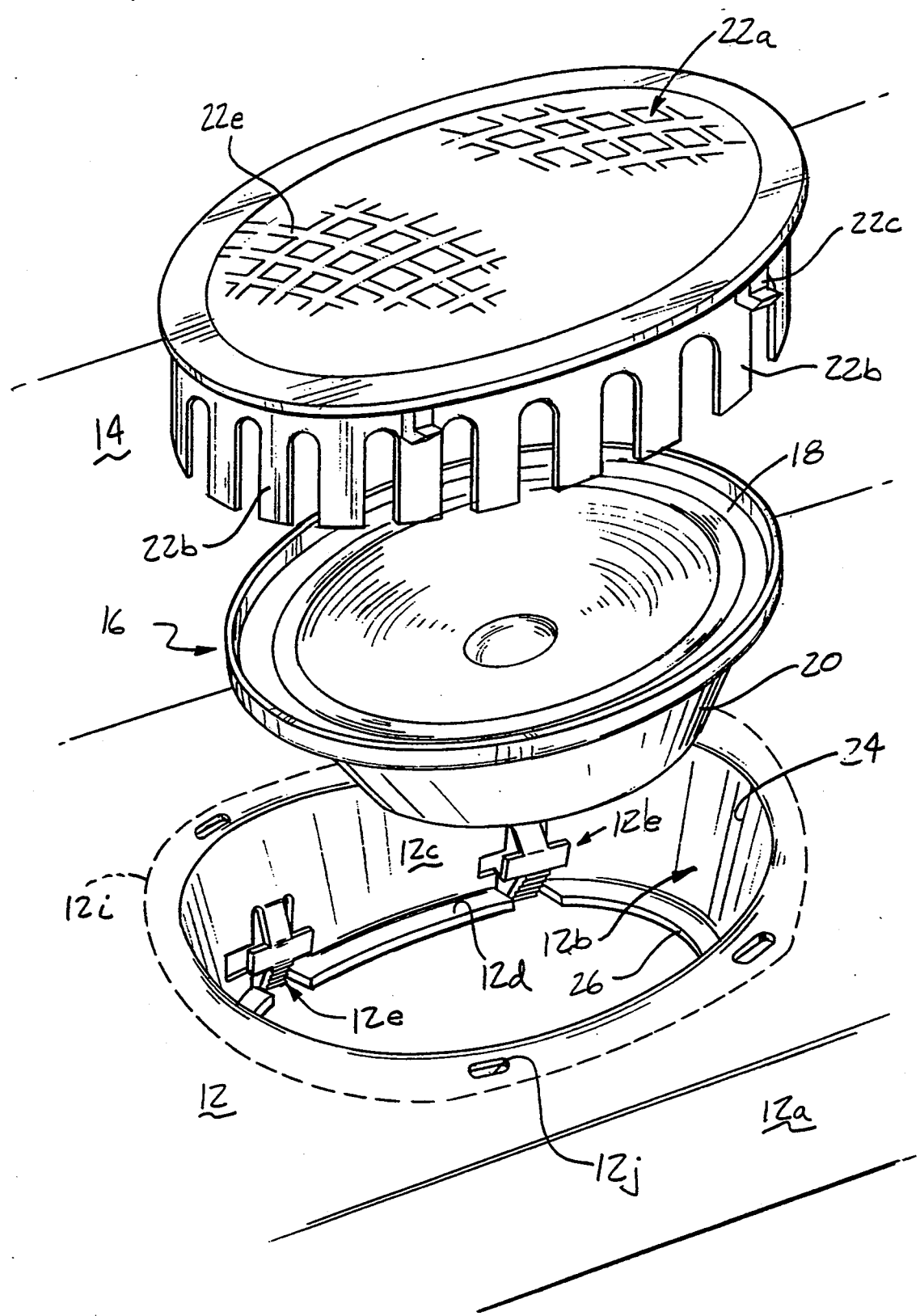
FIG. 5 is a fragmentary exploded view showing the installation of a speaker in the package shelf.

As best seen in FIG. 3, speaker 18 is installed in well structure 12b by dropping the speaker downwardly through the opening 24 in the package shelf 12 and moving the speaker downwardly within well structure 12b. Since the outer periphery 18d of speaker flange 18 corresponds generally to the inner periphery 12h of well structure 12b, as the flange 18 encounters the fingers 12e the lower face 18c of the flange ledge portion engages the upper spring portion 12f of each finger and flexes the finger resiliently outwardly to a position substantially nested within the associated cutout 12f whereby to allow the flange to continue its downward movement within well 12b until the flange assumes a position in which the lower face 18c of the flange ledge portion is seated on ledge 12d, at which time the fingers 12e snap or flex back resiliently inwardly to assume the position seen in FIG. 3 wherein one of the serrations or teeth 12i on the lower face of the foot portion 12g engages the upper edge of flange lip portion 18a to positively clamp the flange, and thereby the speaker, between the fingers 12e and the ledge 12d and positively mount the speaker within the well structure.

Grille structure 22 includes a grille 22a, retainer means in the form of a plurality of circumferentially shaped retainer fingers 22b extending downwardly from grille 22a, and a plurality of circumferentially spaced locking fingers 22c extending downwardly from grille 22a in surrounding relation to retainer fingers 22b.

Grille 22a has an oblong shape corresponding generally to the oblong shape of the panel opening 24 and speaker flange 18 but has an overall size greater than opening 24 and flange 18 so that, when the grille is positioned in overlying relation to opening 24, an annular outer flange portion 22d of the grille overlies and seats on an annular area 12m of the panel surrounding opening 24. Grille 22a is formed in known manner with a grid pattern including intersecting cross bar portions 22e defining openings 22f therebetween to allow passage of the audio emissions from the speaker into the passenger compartment of the motor vehicle.

Retainer fingers 22b extend downwardly from the underface of grille 22a for a distance such that, with the annular outer flange portion 22d of the grille seated against annular panel area 12m, the lower ends 22f of the fingers 22d are seated against the upper face of the ledge portion 18b of the speaker flange 18 inboard of the speaker lip portion 18a whereby to provide a further clamping action with respect to the speaker flange to augment the clamping action provided by the lock portions 12g of fingers 12e. Further, as the grille is lowered to move the fingers 22b downwardly into the well structure, a pair of spaced fingers 22b pass behind a respective pair of lock tabs 12k of each finger 12e to create an interlocked relation as between the grille fingers 22b and the well structure fingers 12e whereby to further augment the clamping of the speaker flange against ledge 12d and further preclude inadvertent displacement of the speaker flange from the well structure ledge.

Locking fingers 22c extend downwardly from the outer annular flange portion 22d of the grille and are arranged to coact with a plurality of holes 12n provided in panel 12 within area 12m. Each finger 22c has a lower hook portion 22g including a leading angled cam face 22h which coacts with the outer upper corner edge 12p of the corresponding hole 12n to flex the finger inwardly as the grille structure is moved downwardly relative to the panel so as to allow the fingers to pass through the openings 12n whereafter, as the lower face of the outer annular flange portion 22d of the grille seats against the upper face of the panel in the area 12m, the fingers snap resiliently outwardly to assume the dotted line position seen in FIG. 3 in which the hook portions 22g are hooked under the underface 12q of the panel to firmly lock the grille structure to the panel. As the hook portions 22g engage the underface 12q of the panel to firmly lock the grille structure to the panel, the lower ends 22f of the retainer fingers 22b seat firmly and positively against the ledge portion 18b of the speaker flange so as to augment the clamping action of the fingers 12e.

It will be seen that the speaker is held in a positively clamped position within the well structure by the combined action of the well structure fingers 12e engaging the lip 18a of the speaker flange to clamp the flange between the fingers and the ledge 12d, the retainer fingers 22b engaging the ledge portion 18b of the speaker flange at their lower ends 22f to further clamp the speaker downwardly against the ledge 12d, and the retainer fingers 22b interlocking with the lock tabs 12k of the fingers 12e to preclude inadvertent displacement of the speaker from the well structure. Fingers 12e and fingers 22b thus coact to provide plural, redundant clamping arrangements to ensure that the speaker is positioned positively in the well structure and is locked positively relative to the well structure.

It will be understood that reinforcing ribs 12r are provided on the underface of the panel for reinforcing well structure 12b and that a fiber fabric or a nonwoven carpet covering may be provided over the package shelf 12 and/or over the grille 22a to provide a grille and package shelf appearance compatible with the decor of the remainder of the interior of the associated motor vehicle.

Figure 6:
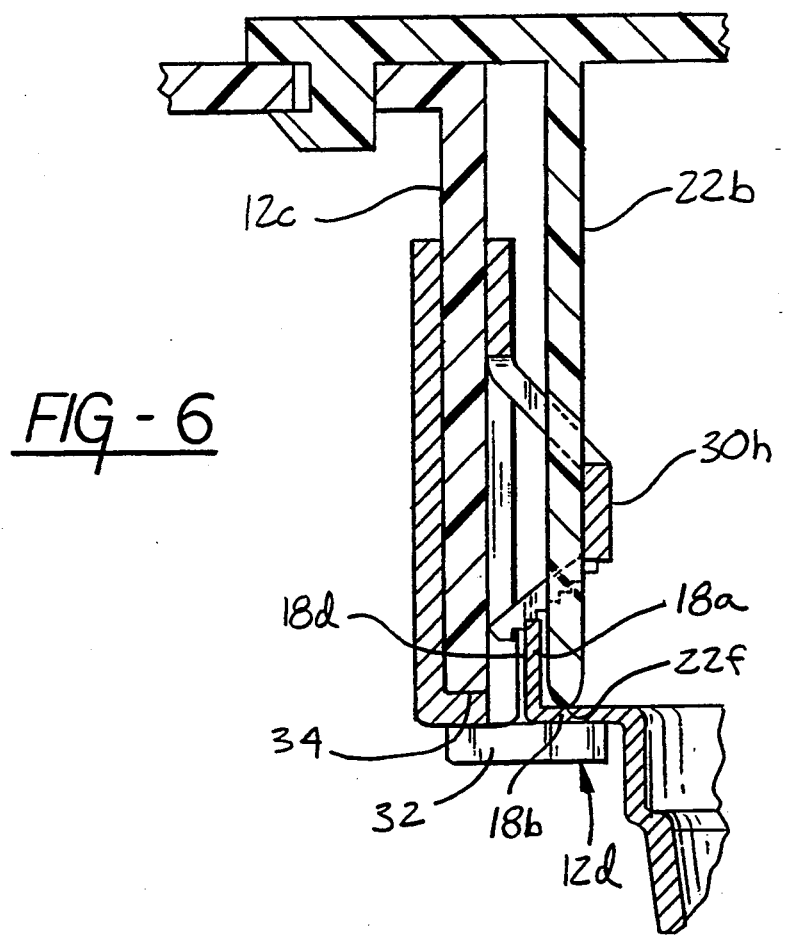
FIG. 6 is a view similar to FIG. 3 but showing a modified embodiment of the invention.
Figure 7:
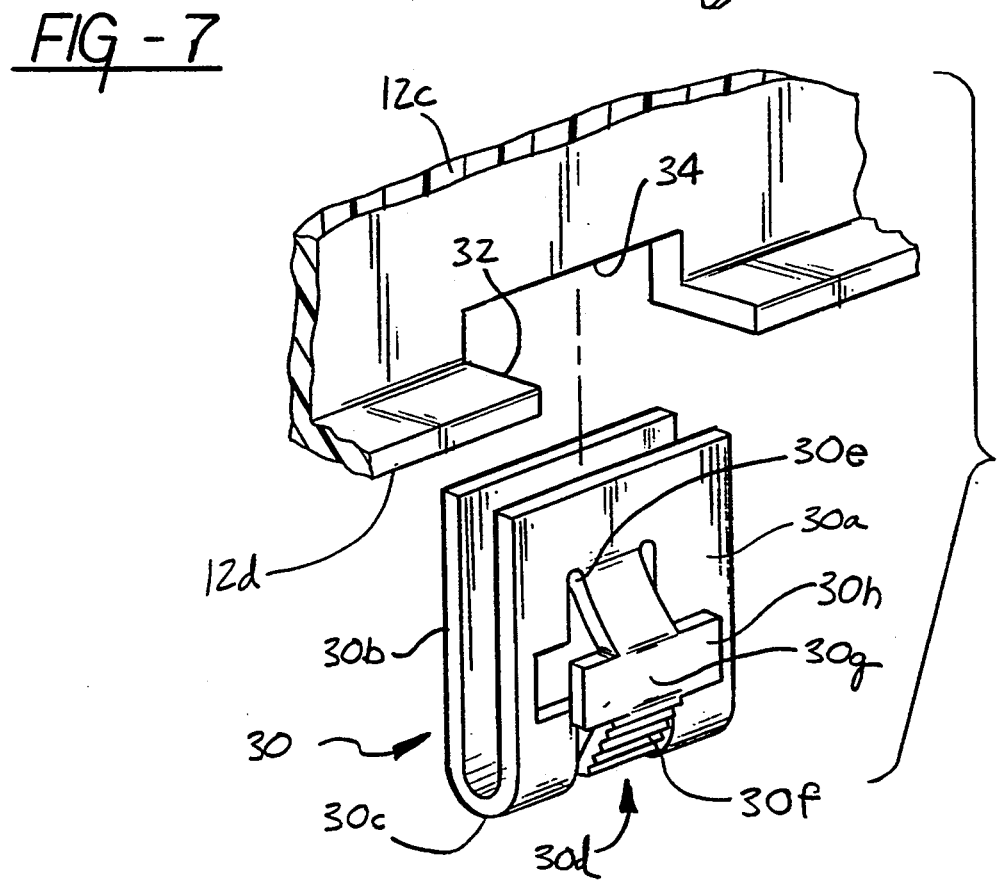
FIG. 7 is a perspective fragmentary view of the modified embodiment of FIG. 6.

The embodiment of the invention seen in FIGS. 6 and 7 is generally similar to the embodiment seen in FIGS. 1-5 with the exception that the retainer fingers of the well structure, rather than being provided as integral portions of the annular side wall 12c of the well structure, are provided by separate clips 30 formed of a suitable resilient material such for example as a suitable metallic or plastic material.

Each clip 30 has a U-shaped configuration including an inner leg portion 30a, an outer leg portion 30b, and a bight portion 30c interconnecting the lower ends of the inner and outer leg portions. The inner leg portion 30a of each clip includes a resilient finger 30d positioned in overlying relation to a cutout 30e in the inner leg 30a. Finger 30d corresponds generally to the fingers 12e of the FIGS. 1-5 embodiment and have a cross configuration corresponding generally to the cross configuration of cutout 30e so that the fingers may move resiliently outwardly in response to downward movement of the speaker flange 18 to a position within the cutout 30e whereafter the fingers may move resilient inwardly to position a serration 30f on a lower lock portion 30g of the finger against the upper edge of speaker flange lip portion 18a to positively clamp the flange, and thereby the speaker, between the fingers 30d and the ledge 12d and positively mount the speaker within the well structure.

As best seen in FIG. 7, each clip 30 is positioned proximate an opening 32 in ledge 12d and proximate a cutout 34 in the lower edge of well structure side wall 12c. With the clip 30 installed on the well structure, the inner and outer leg portions 30a and 30b of the clip straddle the annular side wall 12c of the well structure with the bight portion 30c of the clip positioned against the upper edge of wall structure cutout 34, whereby to position the finger 30d within the well structure in overlying relation to the associated cutout 30e and in overlying relation to an opening 32 in the ledge 12d.

In the assembled position of the well structure, clips, grille, and speaker flange, and as best seen in FIG. 6, the outer periphery 18d of speaker flange 18 is seated against the inner face of the inner legs 30a of the clips 30; the grille structure fingers 22b pass behind the central tab portion 30g of the finger for interlocking coaction with laterally extending lock tabs 30h; and the lower ends 22f of the grille structure fingers 22b are seated against the upper face of the ledge portion 18b of the speaker flange 18 inboard of the speaker lip portion 18a.

The invention mounting structure and methodology will be seen to provide many important advantages. Specifically, the invention allows the speakers to be quickly installed in the associated package shelf; the invention allows the speakers to be installed utilizing relatively unskilled labor; the invention allows the speakers to be installed without the use of any separate fastener elements; and the invention allows the speakers to be rigidly and positively mounted to the package shelf so as to provide rattle free performance and superior audio characteristics.

Whereas preferred embodiments of the invention has been illustrated and described in detail it will be apparent that various changes may be made in the disclosed embodiments without departing from the scope or spirit of the invention. It will be understood that the terms upper, lower, beneath, downwardly, etc., as used in the claims are relative terms and do not denote absolute vertical or horizontal orientations.

We claim:

1. A structure for mounting a speaker in a panel, the speaker including an annular external flange having upper and lower faces and a speaker body positioned within the flange, the mounting structure comprising:

a well structure defined beneath the panel, having an upper end defining an opening in the panel sized to allow the speaker to pass downwardly therethrough into the well, and having a lower end defining a ledge sized to receive and support the lower face of the speaker flange; and retainer means defined on the well structure proximate the ledge and operative in response to movement of the speaker downwardly through the panel opening and positioning of the lower face of the speaker flange on the ledge to engage the upper face of the speaker flange and clamp the speaker flange between the retainer means and the ledge.

2. A mounting structure according to claim 1 wherein:

the retainer means comprises resilient fingers formed integrally with the well structure; and the resilient fingers are operative to flex resiliently outwardly in response to movement of the speaker downwardly into the well and flex resiliently inwardly in response to seating of the speaker flange on the ledge to clamp the speaker flange between the resilient fingers and the ledge.

3. A mounting structure according to claim 2 wherein:

the well structure includes an annular wall; and the resilient fingers are formed integrally in the annular wall.

4. A mounting structure according to claim 2 wherein:

the mounting structure further includes a grille structure including a grille sized to fill the panel opening in overlying relation to a speaker supported on the ledge, and grille structure retainer means extending downwardly from the grille and engaging the upper face of the speaker flange with the lower face of the speaker flange supported on the ledge, whereby to clamp the speaker flange between the ledge and the grille structure retainer means.

5. A mounting structure according to claim 4 wherein:

the grille structure retainer means comprises an annular construction extending downwardly from the grille and sized to fit within the well structure.

6. A structure for mounting a speaker in a panel, the speaker including an annular external flange having upper and lower faces and a speaker body positioned within the flange, the mounting structure comprising:

a well structure defined beneath the panel having an upper end defining an opening in the panel sized to allow the speaker to pass downwardly therethrough into the well and having a lower end defining a ledge sized to receive and support the lower face of the speaker flange; and retainer means defined on the well structure proximate the ledge and operative in response to movement of the speaker downwardly through the panel opening and positioning of the lower face of the speaker flange on the ledge to engage the upper face of the speaker flange and clamp the speaker flange between the retainer means and the ledge;

the retainer means comprising resilient fingers formed integrally with the well structure and operative to flex resiliently outwardly in response to movement of the speaker downwardly into the well and flex resilient inwardly in response to seating of the speaker flange on the ledge to clamp the speaker flange between the resilient fingers and the ledge;

the mounting structure further including a grille structure including a grille sized to fill the panel opening in overlying relation to a speaker supported on the ledge and grille structure retainer means extending downwardly from the grille and engaging the upper face of the speaker flange with the lower face of the speaker flange supported on the ledge whereby to clamp the speaker flange between the ledge and the grille structure retainer means;

the grille structure retainer means comprising an annular construction extending downwardly from the grille and sized to fit within the well structure;

the annular construction comprising a plurality of circumferentially spaced grille structure fingers extending downwardly from the grille.

7. A mounting structure according to claim 6 wherein:

each resilient finger includes a main body and a locking tab portion extending laterally from the main body; and the grille structure fingers pass outwardly of the locking tab portion between the well structure and the locking tab portions to positively interlock the grille structure to the well structure.

8. A structure for mounting a speaker in a panel, the speaker including an annular external flange having upper and lower faces and a speaker body positioned within the flange, the mounting structure comprising:

a well structure defined beneath the panel having an upper end defining an opening in the panel sized to allow the speaker to pass downwardly therethrough into the well and having a lower end defining a ledge sized to receive and support the lower face of the speaker flange; and retainer means defined on the well structure proximate the ledge and operative in response to movement of the speaker downwardly through the panel opening and positioning of the lower face of the speaker flange on the ledge to engage the upper face of the speaker flange and clamp the speaker flange between the retainer means and the ledge;

the retainer means comprising resilient fingers formed integrally with the well structure and operative to flex resiliently outwardly in response to movement of the speaker downwardly into the well and flex resilient inwardly in response to seating of the speaker flange on the ledge to clamp the speaker flange between the resilient fingers and the ledge;

the mounting structure further including a grille structure including a grille sized to fill the panel opening in overlying relation to a speaker supported on the ledge and grille structure retainer means extending downwardly from the grille and engaging the upper face of the speaker flange with the lower face of the speaker flange supported on the ledge whereby to clamp the speaker flange between the ledge and the grille structure retainer means;

the grille structure retainer means comprising an annular construction extending downwardly from the grille and sized to fit within the well structure;

the mounting structure further including coacting means on the grille structure and on the panel operative to snappingly secure the grille structure to the panel in response to downward movement of the annular construction of the grille structure into the well structure.

9. A mounting structure according to claim 8 wherein:

the coacting means comprises resilient downwardly extending fingers on the grille structure in surrounding relation to the annular structure and holes in the panel in surrounding relation to the well structure.

10. A mounting structure according to claim 9 wherein:

the well structure is formed integrally with the panel.

11. A mounting structure according to claim 10 wherein:

the panel comprises a package shelf positioned behind a rear seat of a motor vehicle.

12. A structure for mounting a speaker in a panel of a motor vehicle, the speaker including an annular external flange having upper and lower faces and a speaker body positioned within the flange, the mounting structure including:

a well structure defined beneath the panel, having an upper end defining an opening in the panel sized to allow the speaker to pass downwardly therethrough into the well, and having a lower end defining a ledge sized to receive and support the lower face of the speaker flange; and a grille structure including a grille sized to fit in the panel opening in overlying relation to a speaker supported on the ledge and retainer means extending downwardly from the grille and engaging the upper face of the speaker flange with the lower face of the flange supported on the ledge, whereby to clamp the speaker flange between the ledge and the retainer means.

13. A structure for mounting a speaker in a panel of a motor vehicle, the speaker including an annular external flange having upper and lower faces and a speaker body positioned within the flange, the mounting structure including:

a well structure defined beneath the panel, having an upper end defining an opening in the panel sized to allow the speaker to pass downwardly therethrough into the well, and having a lower end defining a ledge sized to receive and support the lower face of the speaker flange; and a grille structure including a grille sized to fit in the panel opening in overlying relation to a speaker supported on the ledge and retainer means extending downwardly from the grille and engaging the upper face of the speaker flange with the lower face of the flange supported on the ledge, whereby to clamp the speaker flange between the ledge and the retainer means;

the mounting structure further including resilient retainer means on the well structure operative to resiliently yield to allow downward movement of the speaker within the well structure and operative in response to seating of the speaker flange on the ledge to retainingly engage the upper face of the flange to clamp the flange between the ledge and the well structure retainer means.

14. A mounting structure according to claim 13 wherein:

the well structure includes an annular wall; and the well structure retainer means comprises a plurality of circumferentially spaced resilient fingers formed integrally with the wall of the well structure and operative to flex outwardly in response to downward movement of the speaker within the well structure and thereafter flex inwardly in response to seating of the speaker flange on the ledge.

15. A mounting structure according to claim 14 wherein:

the grille structure retainer means comprises an annular structure extending downwardly from the grille, sized to fit within the well structure, and defining lower annular edge means adapted to engage the upper face of the speaker flange with the grille positioned in the panel opening and the lower face of the speaker flange seated on the ledge.

16. A mounting structure according to claim 15 wherein:

the annular structure includes a plurality of circumferentially spaced grille structure fingers extending downwardly from the grille.

17. A mounting structure according to claim 16 wherein:

each resilient finger includes a main body and a locking tab portion extending laterally from the main body; and the grille structure fingers pass outwardly of the locking tab portions between the well structure and the locking tab portion to positively interlock the grille structure to the well structure.

18. A mounting structure according to claim 15 wherein:

the mounting structure further includes coacting means on the grille structure and on the panel operative to snappingly secure the grille structure to the panel in response to downward movement of the annular structure of the grille structure into the well structure.

19. A mounting structure according to claim 18 wherein:

the coacting means comprises resilient downwardly extending fingers on the grille in surrounding relation to the annular structure and holes in the panel in surrounding relation to the well structure.

20. A mounting structure according to claim 19 wherein:

the well structure is formed integrally with the panel.

21. A mounting structure according to claim 20 wherein:

the panel comprises a package shelf positioned behind a rear seat of the motor vehicle.

22. A method of mounting a speaker in a panel, the speaker including an annular external flange and a speaker body positioned within the flange, the method comprising the steps of:

providing an opening in the panel sized to pass the speaker flange;

providing a ledge beneath the panel proximate the opening sized to seat the speaker flange;

moving the speaker downwardly through the opening to seat the speaker flange on the ledge; and providing retainer means operative in response to seating of the speaker flange on the ledge to engage an upper face of the speaker flange and clamp the speaker flange between the retainer means and the ledge.

23. A method according to claim 22 wherein:

the step of providing a ledge comprises providing a well structure beneath the panel having an annular wall and defining a ledge proximate the lower end of the annular wall; and the step of providing retainer means comprises providing resilient means on the well wall which are operative to flex outwardly in response to downward movement of the speaker into the well and flex inwardly in response to seating of the speaker flange on the ledge to engage the upper face of the speaker flange and clamp the speaker flange between the ledge and the resilient means.

24. A method according to claim 22 wherein:

the well structure is formed integrally with the panel.

25. A method of mounting a speaker in a panel, the speaker including an annular external flange and a speaker body positioned within the flange, the method comprising the steps of:

providing an opening in the panel sized to pass the speaker flange;

providing a ledge beneath the panel proximate the opening sized to seat the speaker flange;

moving the speaker downwardly through the opening to seat the speaker flange on the ledge; and providing retainer means operative in response to seating of the speaker flange on the ledge to engage an upper face of the speaker flange and clamp the speaker flange between the retainer means and the ledge;

the step of providing a ledge comprising providing a well structure beneath the panel having an annular wall and defining a ledge proximate a lower end of the annular wall;

the step of providing retainer means comprising providing resilient means on the well wall which are operative to flex outwardly in response to downward movement of the speaker into the well and flex inwardly in response to seating of the speaker flange on the ledge to engage the upper face of the speaker flange and clamp the speaker flange between the ledge and the resilient means;

the method including the further steps of providing a grille structure including a grille sized to fill the opening and grille retainer means extending downwardly from the grille, and moving the grille structure to a position where the grille fills the opening and the grille retainer means extends downwardly from the grille for engagement at a lower end of the retainer means with the upper face of the speaker flange to clamp the speaker flange between the ledge and the grille retainer means.

26. A method according to claim 25 wherein:

the method includes the further step of snappingly securing the grille structure to the panel in response to movement of the grille to a position where the grille fills the opening.

27. A method according to claim 26 wherein:

the step of snappingly securing the grille structure to the panel comprises providing resilient downwardly extending fingers on the grille structure in surrounding relation to the grille retainer means and holes in the panel in surrounding relation to the panel opening for snapping coaction with the resilient downwardly extending fingers on the grille structure.

28. A method of mounting a speaker in a panel of a motor vehicle, the speaker including an annular external flange and a speaker body positioned within the flange, the method comprising the steps of:

providing an opening in the panel sized to pass the speaker flange;

providing a ledge beneath the panel proximate the opening sized to seat the speaker flange;

moving the speaker downwardly through the opening to seat the speaker flange on the ledge;

providing a grille structure including a grille sized to fill the opening and grille retainer means extending downwardly from the grille; and moving the grille structure to a position where the grille fills the opening and the grille retainer means extends downwardly from the grille and engages at a lower end thereof with an upper face of the speaker flange to clamp the speaker flange between the ledge and the grille retainer means.

29. A method of mounting a speaker in a panel of a motor vehicle, the speaker including an annular external flange and a speaker body positioned within the flange, the method comprising the steps of:

providing an opening in the panel sized to pass the speaker flange;

providing a ledge beneath the panel proximate the opening sized to seat the speaker flange;

moving the speaker downwardly through the opening to seat the speaker flange on the ledge;

providing a grille structure including a grille sized to fill the opening and grille retainer means extending downwardly from the grille; and moving the grille structure to a position where the grille fills the opening and the grille retainer means extends downwardly from the grille and engages at a lower end thereof with an upper face of the speaker flange to clamp the speaker flange between the ledge and the grille retainer means;

the step of providing a ledge comprising providing a well structure beneath the panel having an annular wall and defining the ledge proximate the lower end of the annular wall;

the method including the further step of providing resilient means on the well wall which are operative to flex outwardly in response to movement of the speaker into the well and flex inwardly in response to seating of the speaker flange on the ledge to engage the upper face of the speaker flange and clamp the speaker flange between the ledge and the resilient means.

30. A method according to claim 29 wherein:

the method comprises the further step of snappingly securing the grille to the panel in response to movement of the grille to a position where the grille fills the opening.

31. A method according to claim 30 wherein:

the step of snappingly securing the grille to the panel comprises providing resilient downwardly extending fingers on the grille structure in surrounding relation to the grille retainer means and holes in the panel in surrounding relation to the panel opening for snapping coaction with the resilient downwardly extending fingers on the grille structure.

32. A method according to claim 29 wherein:

the well structure is formed integrally with the panel.

33. A method of mounting a speaker in a panel, the speaker including an annular external flange and a speaker body positioned within the flange, the method comprising the steps of:

provning an opening in the panel sized to pass the speaker flange;

providing a well structure beneath the panel having an annular wall and defining a ledge proximate a lower end of the annular wall;

moving the speaker downwardly through the opening to seat the speaker flange on the ledge;

providing retainer fingers on the annular wall proximate the ledge operative in response to seating of the speaker flange on the ledge to engage an upper face of the speaker flange and clamp the speaker flange between the retainer means and the ledge;

providing a grille structure including a grille sized to fill the opening and retainer means extending downwardly from the grille;

moving the grille structure to a position where the grille fills the opening and the grille retainer means extends downwardly from the grille for engagement at a lower end thereof with an upper face of the speaker flange to clamp the speaker flange between the ledge and the grille retainer means; and providing coacting means on the grille structure retainer means and on the resilient fingers which interlock in response to movement of the grille retainer means downwardly into engagement with the speaker flange.

* * * * *